United States Patent
Pust et al.

(10) Patent No.: US 6,842,308 B1
(45) Date of Patent: Jan. 11, 2005

(54) THERMAL COMPENSATION FOR HEAD PROTRUSION IN A MAGNETIC DRIVE

(75) Inventors: Ladislav R. Pust, Savage, MN (US); Youping Mei, Eden Prairie, MN (US); Sunita Gangopadhyay, Chanhassen, MN (US); Jumna P. Ramdular, Brooklyn Park, MN (US); Mallika Kamarajugadda, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 209 days.

(21) Appl. No.: 09/845,619

(22) Filed: Apr. 30, 2001

Related U.S. Application Data
(60) Provisional application No. 60/218,121, filed on Jul. 13, 2000.

(51) Int. Cl.[7] .................................................. G11B 5/60
(52) U.S. Cl. ..................................................... 360/234.7
(58) Field of Search ................................ 360/126, 317, 360/234.6–234.7

(56) References Cited

U.S. PATENT DOCUMENTS

| | | | |
|---|---|---|---|
| 5,083,365 A | * 1/1992 | Matsumoto | 29/603.12 |
| 5,473,486 A | * 12/1995 | Nepela et al. | 360/234.7 |
| 5,687,045 A | * 11/1997 | Okai et al. | 360/126 |
| 5,710,683 A | 1/1998 | Sundaram | 360/126 |
| 5,712,565 A | 1/1998 | Schultz et al. | 324/252 |
| 5,764,056 A | 6/1998 | Mao et al. | 324/252 |
| 5,896,243 A | 4/1999 | Koshikawa et al. | 360/103 |
| 5,898,106 A | * 4/1999 | Babcock et al. | 73/105 |
| 5,898,542 A | 4/1999 | Koshikawa et al. | 360/103 |
| 5,909,340 A | 6/1999 | Lairson et al. | 360/104 |
| 5,949,627 A | 9/1999 | Williams et al. | 360/126 |
| 5,963,401 A | * 10/1999 | Dee et al. | 360/316 |
| 5,986,851 A | 11/1999 | Angelo et al. | 360/103 |
| 6,130,809 A | * 10/2000 | Santini | 360/317 |
| 6,219,200 B1 | * 4/2001 | Waki et al. | 360/126 |
| 6,373,659 B1 | * 4/2002 | Hamaguchi et al. | 360/234.3 |
| 6,473,265 B1 | * 10/2002 | Zhou et al. | 360/126 |
| 6,477,007 B1 | * 11/2002 | Shukh et al. | 360/126 |

* cited by examiner

*Primary Examiner*—Brian E. Miller
(74) *Attorney, Agent, or Firm*—Westman, Champlin & Kelly, P.A.

(57) ABSTRACT

A head for a magnetic drive that includes a substrate with a thermal expansion rate CTE1. A transducer in the head has a bond to the substrate and has a transducer thermal expansion rate CTE2 that is greater than CTE1. A restraint layer in the substrate has a bond to one side of the transducer and has a first restraint layer thermal expansion rate CTE3 that is lower than CTE1. The restraint layer restrains protrusion of the transducer beyond the substrate at higher operating temperatures.

19 Claims, 8 Drawing Sheets

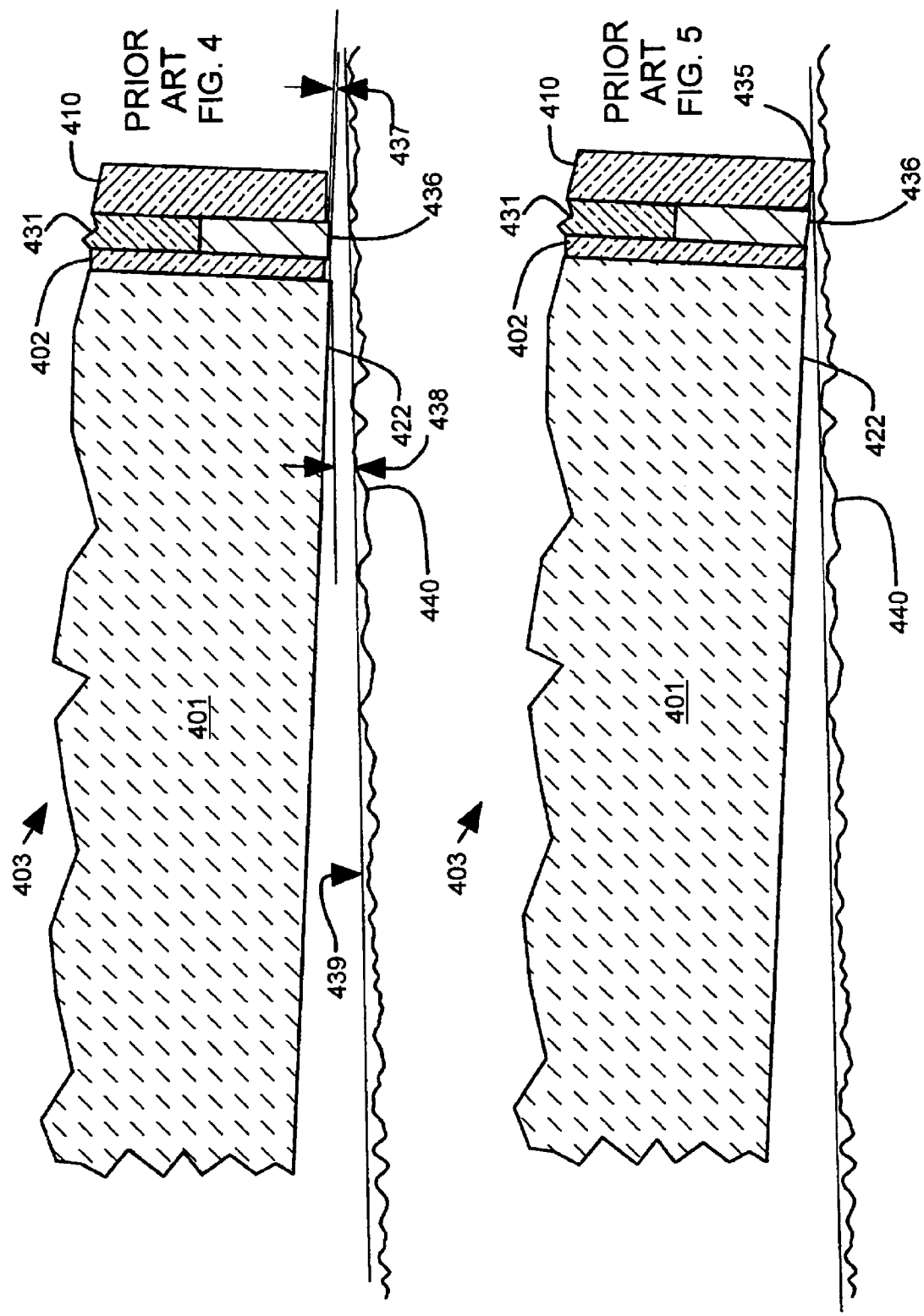

THERMAL COMPENSATION FOR HEAD PROTRUSION IN A MAGNETIC DRIVE

CROSS-REFERENCE TO RELATED APPLICATION

This application claims priority benefits from U.S. Provisional Application 60/218,121 titled "Reduction of Thermal Pole Tip Recession in Magnetoresistive And/or GMR Heads," filed Jul. 13, 2000.

FIELD OF THE INVENTION

This invention relates to heads for magnetic drives. In particular, this invention relates to heads that include transducers and that are made from multiple materials with differing coefficients of temperature expansion (CTEs).

BACKGROUND OF THE INVENTION

After a disc drive is energized, it warms up and has a temperature rise. In particular, there are large temperature rises in the heads used in a disc drive. The heads include magnetic transducers deposited on slider substrates. The magnetic transducers carry read/write currents that generate heat in the heads. The temperature rise in the heads is large because the heads have a small surface area in relation to the amount of heat that is dissipated in the magnetic transducers.

The magnetic transducers have a higher coefficient of thermal expansion (CTE) than the slider substrates. As temperature increases, the magnetic transducers thermally expand at a greater rate than the slider substrates. The thermal expansion causes the pole/shield tips of the magnetic transducers to protrude with respect to an air bearing surface of the slider substrate. At higher temperatures, the pole/shield tips are closer to the media and the transducer-media spacing is reduced. If the transducer-media spacing at lower temperature is not large enough, the protruded pole/shield tips hit the media at higher temperature.

To avoid transducer-media contact at higher temperatures, the fly height at lower temperatures is kept relatively large. This large fly height at lower temperatures, however, undesirably limits the electrical performance of transducers, particularly the areal bit density (gigabits per square inch) that can be achieved.

A method and apparatus are needed that correct the problems associated with pole tip protrusion at higher temperatures.

SUMMARY OF THE INVENTION

Disclosed is a head for a magnetic drive that includes a substrate having a substrate thermal expansion rate CTE1 and a transducer that is bonded to the substrate and that has a transducer thermal expansion rate CTE2 that is greater than CTE1. At least a first restraint layer having a thermal expansion rate CT3 lower than CTE1 is bonded to the transducer.

At higher operating temperatures, the restraint layer restrains thermal expansion of the transducer, reducing the problem of pole tip protrusion.

Additional features and benefits will become apparent with a careful review of the following detailed description and the corresponding drawings.

BRIEF DESCRIPTION OF THE DRAWINGS

FIG. 4 schematically illustrates a cross-section of a head at room temperature flying over a disc surface.

FIG. 5 schematically illustrates a cross-section of a head at elevated temperatures with pole tip protrusion flying over a disc surface.

DETAILED DESCRIPTION

In the present invention, at least one restraint layer is bonded to a magnetic transducer on a slider substrate. The restraint layer has a lower coefficient of thermal expansion (CTE) than the slider substrate. At higher operating temperatures, the restraint layer tends to restrain the thermal expansion of the magnetic transducer and reduce pole tip/shield protrusion. The fly height of the transducer can be made smaller at lower temperatures without risking transducer-media contact at higher temperatures. The reduced fly height increases the performance of the disc drive, particularly the areal bit density (gigabits per square inch).

With the present invention, areal densities above 20 gigabits/square inch (3.1 gigabits/square cm) can be achieved with a reduced risk of damage to the head and magnetic media.

Figure 1:
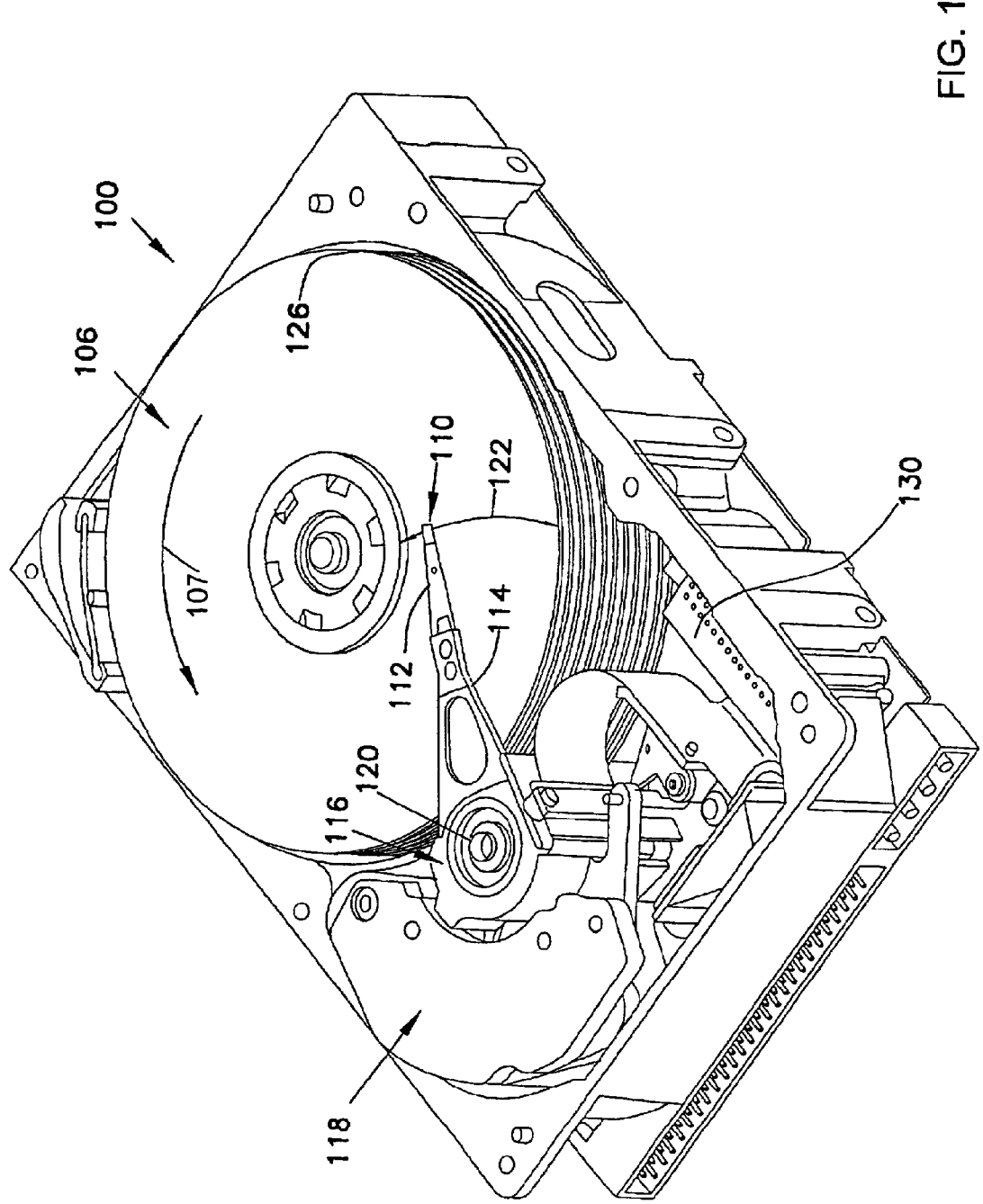
FIG. 1 illustrates an embodiment of a disc drive including a head with a magnetic transducer that is thermally compensated to reduce pole tip protrusion.

FIG. 1 illustrates an embodiment of a disc drive 100 including a head 110 with one or more thermal restraining layers. Disc drive 100 includes a disc pack 126 having storage surfaces 106 that are typically layers of magnetic material. The disc pack 126 includes a stack of multiple discs. A read/write head assembly 112 includes the head 110 with a read/write transducer for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. A circuit at location 130 controls the position of head 110 and electrically interfaces the read/write head 110 with a computing environment.

Figure 2:
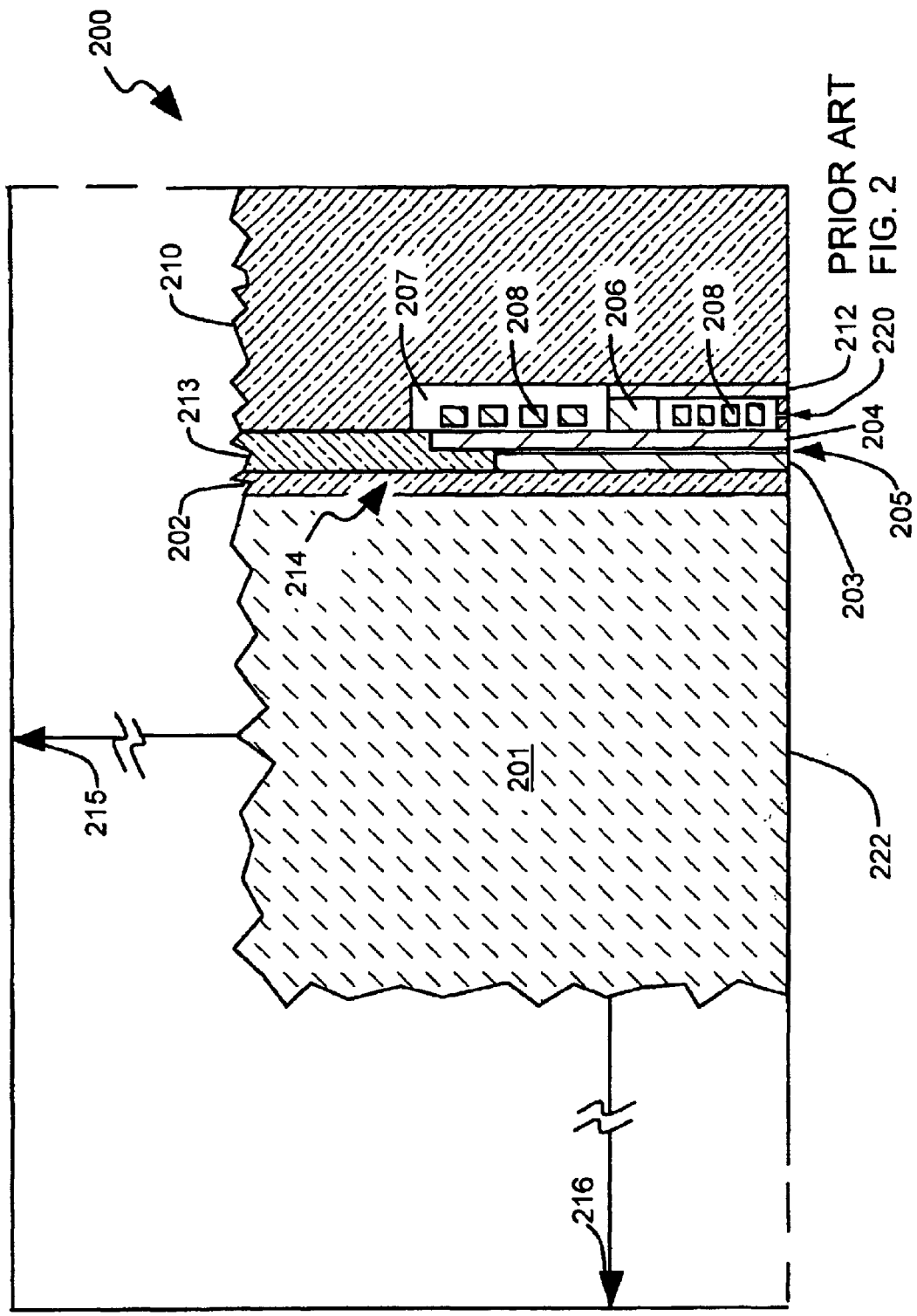
FIG. 2 schematically illustrates a cross-section of a head before lapping.

FIG. 2 schematically illustrates a partial cross-section of a head 200 for a disc drive before lapping. Head 200 includes a thin film read/write transducer 214 with gaps and other internal dimensions adapted for areal densities of 20 gigabits/square inch or more. The transducer 214 is deposited on a substrate 201. A large part of the head 200 is built from a substrate 201 that extends to edges 215 and 216 as illustrated. The portion of head 200 that is illustrated in cross-section in FIG. 2 is near the trailing edge of head 200 along a central plane perpendicular to an air bearing surface 222 of the head 200.

The substrate 201 is preferably formed from an electrically conducting ceramic material, such as a mixture of aluminum oxide ($Al_2O_3$) and titanium carbide (TiC), referred to in this application as "AlTiC".

A basecoat material 202 is deposited on the top of substrate 201. The basecoat material 202 is an electrically insulating material, typically $Al_2O_3$, with a CTE close to that of substrate 201. The basecoat material 202 forms a bond to the substrate material 201.

Deposited metallic magnetic layers from alloys of iron (Fe), nickel (Ni), or cobalt (Co) form a lower shield 203, shared pole 204, top pole 212 and a core 206. Core 206 completes a write magnetic circuit through the center of a coil 208 and through a write gap 220 at the air bearing surface 222. The metallic magnetic layers 203, 204, 212, 206 typically have a large coefficient of thermal expansion (CTE), e.g. magnetic alloy $Ni_{79}Fe_{21}$ with a CTE of about $12.2 \times 10^{-6}/°$ C.

The write coil 208 in the transducer 214 is preferably made from copper with CTE=$16.5 \times 10^{-6}/°$ C. or from another highly electrically conducting metal or alloy.

A coil insulator 207 is typically formed from a cured photoresist with large CTE, similar to or even larger than the CTE of the metallic magnetic layers 203, 204, 212, 206 and the CTE of the write coil 208.

An additional deposited insulating layer 213 fills the space around lower shield 203, and shared pole 204. Layer 213 is typically made from $Al_2O_3$ and forms a bond to basecoat layer 202.

A read sensor 205 is formed in a very thin layer between lower shield 203 and shared pole 204. Read sensor 205 is typically a magnetoresistive (MR) or giant magnetoresistive (GMR) sensor.

For clarity, electrical leads and contacts, formed from Cu, Au, or other metals or metallic alloys in a conventional manner are not illustrated in FIG. 2

An insulating overcoat or topcoat layer 210 is deposited on the top of all the transducer 214. Overcoat layer 210 is typically also made from $Al_2O_3$ with a CTE close to that of the substrate 201. Overcoat layer 210 is planarized after deposition to expose electrical contacts (not illustrated) for the coil 207 and read sensor 205 in the transducer 214.

After the head 200 is formed as illustrated in FIG. 2, it is lapped to shape the air bearing surface (ABS) 222 that flies over the magnetic media. This lapping is explained in more detail below in connection with FIG. 3.

Figure 3:
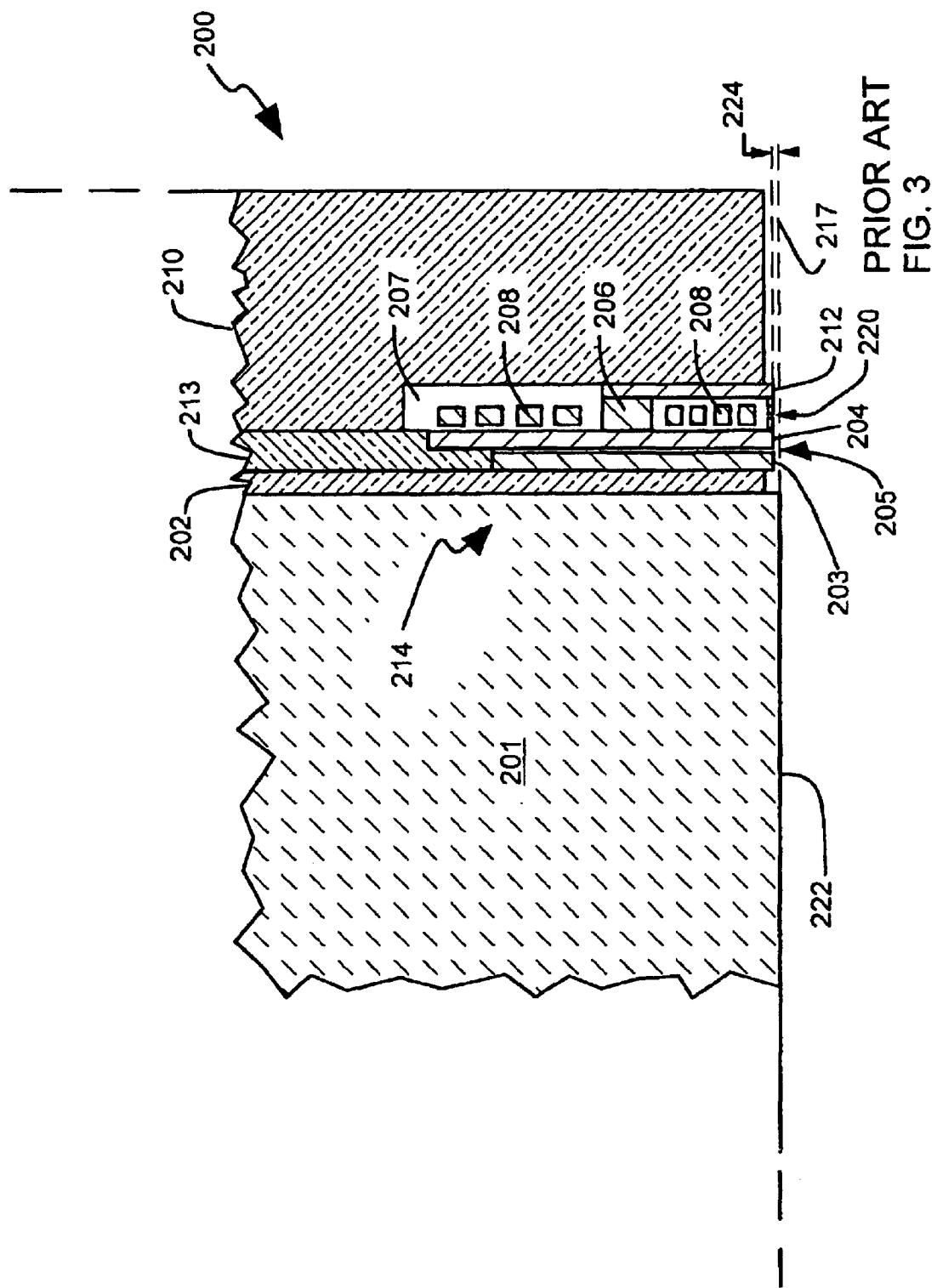
FIG. 3 schematically illustrates a cross-section of a head after lapping.

FIG. 3 schematically illustrates a cross-section of the head 200 illustrated in FIG. 2 after lapping has been performed on the head 200. During the process of lapping of the air bearing surface (ABS) 222, the substrate 201 and layers 202, 203, 204, 205, 210, 212 are eroded at different rates due to their different mechanical and chemical properties. FIG. 3 schematically illustrates the typical positions of the various layers relative to the air bearing surface (ABS) 222 after lapping. Typically, the layers 202 and 210, which can be $Al_2O_3$ or other materials, are eroded more than the substrate 201. Layers 202, 210 are thus recessed with respect to the lapped air bearing surface 222 of substrate 201. Metallic magnetic layers 203, 204, 212 forming the transducer 214 are also recessed with respect to the substrate 201 but their recession is typically smaller than that of the $Al_2O_3$ layers. The magnitude of the recession of magnetic poles and shields with respect to the substrate edge is critical for head performance and it is called "Pole Tip Recession" (PTR) 224. The dashed line 217 shows where the edges of all the layers would be with zero recession. For clarity, the magnitude of pole tip recession 224 is exaggerated in FIG. 3 as compared to an actual head.

The head 200 illustrated in FIGS. 2–3 does not include a restraint layer, and the problem with pole tip protrusion in a head like head 200 is illustrated in more detail below in connection with FIGS. 4–5.

FIGS. 4–5 schematically illustrate a cross-section of a head 403 flying over a disc surface 440 at room temperature (FIG. 4) and at an elevated temperature (FIG. 5). During disk drive operation, electrical power is dissipated in the disc drive, particularly in the transducer 436, and the temperature of the head 403 increases. The temperature of the head 403 itself and/or of the transducer 436 can be significantly higher than the overall disc drive temperature due to the large amount of heat dissipated in the transducer 436 relative to the small size of the head 403.

The CTEs of a substrate 401 and of various deposited layers 402, 436, 410, 431 are typically different from one another. Typically, the magnetic metallic layers in head 436 have larger CTEs, and insulating layers 402, 431, 410 have lower CTEs. All these layers are grown on substrate 401 that has much larger volume compared to the volume of the layers 431, 410, 402 and the transducer 436. Due to the different CTEs of materials in various head layers, the shape of the head 403 distorts at elevated temperature. The pole tip recession (PTR) 437 that is present at room temperature as illustrated in FIG. 4 is reduced or completely lost with elevated head temperature as illustrated at FIG. 5. The change of PTR with temperature is therefore referred to as thermal PTR (T-PTR).

The CTEs of the aluminum oxide layers 402, 431, 410 are close to that of substrate 401, so that the pole/shield protrusion at higher operating temperatures is due primarily to expansion of the metallic layers in transducer 436. This expansion is only weakly constrained by the adjacent substrate 401, basecoat layer 402, and overcoat layers 431, 410.

During drive operation, the head 403 flies above the spinning magnetic recording media surface 440. Over all operating temperatures of the drive, the fly height 438 needs to be kept low enough as required for reading and writing the desired high areal bit density. The head 403 should not get in contact with magnetic media surface 440 as illustrated in FIG. 5. The fly height 438 is primarily determined by the shape of the air-bearing surface 422 that is patterned into the slider substrate 401. The performance of the transducer 436 depends primarily on the distance between the recording media and the pole/shield tips of the head 436. There is thus a need to reduce fly height to improve head performance, and a conflicting need to increase fly height to avoid head crashes due to protrusion at high temperatures as illustrated in FIG. 5.

FIG. 4 shows schematically a transducer 436 at room operating temperature flying above a magnetic media surface 440 illustrated with exaggerated roughness. In FIG. 4, the transducer 436 does not contact the highest points 439 of the magnetic media surface 440. FIG. 5 shows schematically the same transducer 436 at high operating temperature. Most of the volume of the transducer 436 is formed by metallic layers and the coil insulator that have large CTEs. Due to the larger CTE of metallic layers in the transducer and possibly also of cured photoresist used as coil insulator, the pole/shield tips of transducer 436 protrude more with respect to the air bearing surface 422 at higher temperature (FIG. 5) than at room temperature (FIG. 4). This effect known as T-PTR places the transducer 436 closer to the magnetic media surface 440 at higher temperatures.

The magnetic transducer 436 has to fly low, close enough to the media, to have good electrical performance. At the same time, the head 403 has to stay flying under all conditions without mechanically touching the media. If the fly height at lower ambient temperature (see FIG. 4) is not large enough, the protruded pole/shield tips at higher temperature (see FIG. 5) hit the media causing thermal asperities. This results in magnetic instabilities and contamination leading to tribological problems, and eventually a head crash. To avoid head-media contact at higher drive temperature (FIG. 5), the fly height has to be large enough at lower temperature (FIG. 4), with undesirable effect on head electrical performance.

It is difficult to keep the fly height low enough over the operating temperature range without having head-media contact. This problem is solved, as explained below in connection with FIGS. 6–11 by a head and transducer design in which the expansion of the pole/shields is restrained by a restraint layer at elevated drive temperatures.

Figure 6:
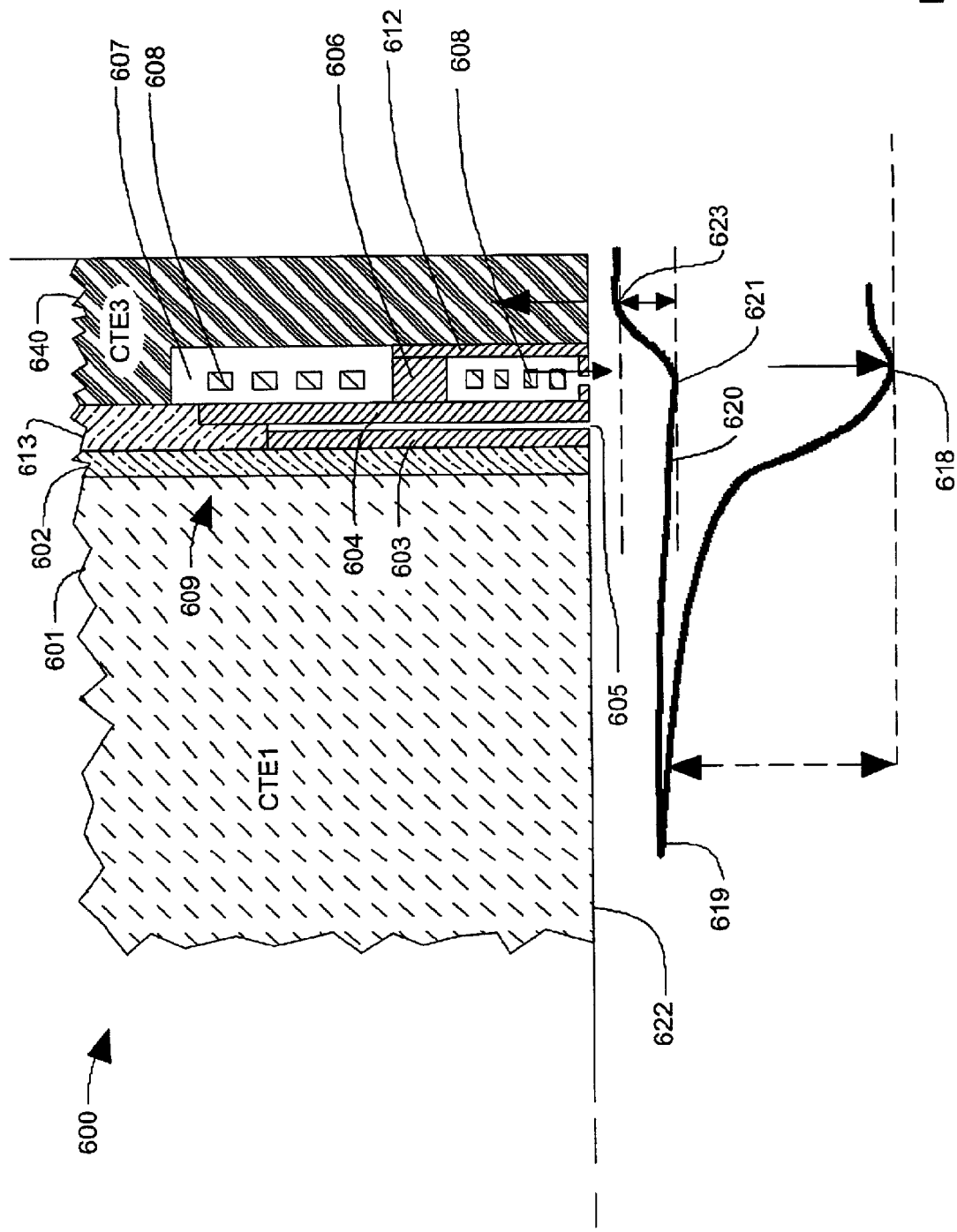
FIG. 6 schematically illustrates a cross-section of a head that includes a restraint layer.

FIG. 6 schematically illustrates a partial cross-section of a head 600 that includes a restraint layer 640 with a thermal expansion rate CTE3. Restraint layer 640 is formed of a material with a CTE that is lower than the thermal expansion rate CTE1 of a substrate 601. Restraint layer 640 has dimensions and mechanical material properties that restrain the thermal expansion of transducer 609, which has a thermal expansion rate CTE2 that is greater than CTE1. The restraint layer 640 has dimensions and material properties that can be selected experimentally to limit protrusion of the transducer beyond the substrate over an operating temperature range. The transducer 609 and the restraint layer 640 are bonded together, either directly or through an intervening layer, to have a combined expansion rate that is substantially matched with CTE1, the expansion rate of the substrate 601.

T-PTR is controlled by the restraint layer 640 and pole tip protrusion is eliminated or reduced. Fly height can be kept low at room temperatures without risking head-media contact at higher temperatures.

Head 600 includes a thin film recording transducer 609 with gaps and other internal dimensions adapted for areal densities of 20 gigabits/square inch or more. The transducer 609 is deposited on a substrate 601. A large part of the head 600 is built from the substrate 601. The substrate 601 preferably has a vertical thickness of approximately 300 microns and the patterned magnetic components of transducer 609 preferably have a vertical height of approximately 50 microns. The portion of head 600 that is illustrated in cross-section in FIG. 6 is near the trailing edge of head 600 along a central plane perpendicular to an air bearing surface 622 of the head 600.

The substrate 601 is preferably formed from a material with a large linear coefficient of temperature expansion (CTE), preferably in the range of $7.0 \times 10^{-6}$ to $8.3 \times 10^{-6}/°$ C. Substrate 601 is typically an electrically conducting ceramic material made primarily from a mixture of aluminum oxide ($Al_2O_3$) and titanium carbide (TiC), referred to in this application as "AlTiC". Substrate 601 can be formed of other materials, as well. For example, substrate 601 can be formed from $Al_2O_3$, TiO or SiC, either alone or mixed with one another. Substrate 601 can be hot pressed and sintered mixtures, or it can be grown single crystal or polycrystalline pure materials, for example.

A basecoat material 602 is deposited on the top of substrate 601. The basecoat material 602 is an electrically insulating material, typically $Al_2O_3$, with a CTE close to that of substrate 601. The basecoat material 602 forms a bond to the substrate material 601.

Deposited patterned metallic magnetic layers from alloys of iron (Fe), nickel (Ni), or cobalt (Co) form a lower shield 603, shared pole 604, top pole 612 and a core 606. Magnetic alloys may also include trace amounts of other materials such as chromium or vanadium. Magnetic alloys may be deposited by known processes such as electroplating or sputtering. Core 606 completes a write magnetic circuit through the center of a coil 608 and through a write gap at the air bearing surface 622. The metallic magnetic layers 603, 604, 612, 606 typically have a large coefficient of thermal expansion (CTE), e.g. magnetic alloy $Ni_{79}Fe_{21}$ with a CTE of about $12.2 \times 10^{-6}/°$ C. The lower shield 603 forms a bond to the basecoat layer 602. The deposited magnetic layers 603, 604, 612, 606 form bonds where they contact one another, as well.

The write coil 608 is preferably made from copper with CTE=$16.5 \times 10^{-6}/°$ C. or from another highly electrically conducting metal or alloy.

A coil insulator 607 is typically formed from a cured photoresist with large CTE, similar to, or even larger than the CTE of the metallic magnetic layers 603, 604, 612, 606 and the CTE of the write coil 608.

An additional deposited insulating layer 613 fills the space around lower shield 603, and shared pole 604. Layer 613 is typically made from $Al_2O_3$ and forms a bond to basecoat layer 602. It will be understood by those skilled in the art that insulating layer 613 will typically be deposited in several steps as sublayers before or after an adjacent metallic layer is deposited.

A read sensor 605 is formed in a very thin layer between lower pole 603 and shared pole 604. Read sensor 605 is typically a magnetoresistive (MR) or giant magnetoresistive (GMR) sensor.

For clarity, electrical leads and contacts, formed from Cu, Au, or other metals or metallic alloys in a conventional manner are not illustrated in FIG. 6. Other materials that make only a small volume fraction of the head can also be present. For example, very thin films, such as a bonding film 642, of intermediate materials can be deposited to improve bonds between layers of dissimilar materials.

The restraint layer 640 is deposited on the top of all the transducer structure 609. Restraint layer 640 is typically planarized after deposition to expose electrical contacts (not illustrated) for the transducer 609. The restraint layer 640 serves as a protective overcoat for the components of the transducer.

After the head 600 is formed as illustrated in FIG. 6, it is lapped to shape the air bearing surface (ABS) 622 that flies over the magnetic media To keep the fly height low without contact between the transducer and the media under all operating temperatures, T-PTR has to be low. With increasing recording density, the maximum allowable fly height decreases and consequently T-PTR has to be lower.

At elevated temperature, all the metallic components and the photoresist are expanding significantly more than the substrate. The actual pole/shield protrusion (T-PTR) at a given temperature higher than the ambient temperature, is given by interplay of CTE, Young's Modulus, and the Poisson's Ratio of all the materials used in the head. Examples of these values are in Table 1. The values for a particular head depend on particular manufacturing process and may differ from values in this Table 1, depending on the processes used.

TABLE 1

|  | linear CTE (×10⁻⁶/° C.) | Young's Modulus [GPa] | Poisson's Ratio |
| --- | --- | --- | --- |
| AlTiC | 7.9 | 420 | 0.22 |
| Aluminum oxide | 7.8 | 120 | 0.25 |
| NiFe | 12.2 | 207 | 0.3 |
| Cu | 16.5 | 117 | 0.33 |
| Photoresist | 51 | 7 | 0.2 |

If all the materials used in the head would have the same CTE, then the T-PTR would be zero and the distance between media and pole tips and shield tips would not change with head temperature. However, such a thermally matched combination of suitable substrate, magnetic, coil and insulating materials has not been found.

In the head 600 illustrated in FIG. 6, T-PTR is significantly reduced. The pole/shield protrusion at elevated temperatures is reduced by building the head using at least one layer such as layer 640 that has a CTE that is small compared to the CTE of the substrate 601. Layer 640 is effectively "shrinking" relative to the substrate 601 as temperature increases. Materials that can be used for layer 640 include AlN, Si$_3$N$_4$, and SiO$_2$. Their approximate properties are listed below in Table 2.

TABLE 2

|  | linear CTE (×10⁻⁶/° C.) | Young's Modulus (GPa) | Poisson's Ratio |
| --- | --- | --- | --- |
| AlTiC | 7.9 | 420 | 0.22 |
| Aluminum oxide | 7.8 | 120 | 0.25 |
| Aluminum nitride | 4.3 | 155 | 0.25 |
| Si$_3$N$_4$ | 3.2 | 200 | 0.25 |
| SiO$_2$ | 1.0 | 58 | 0.25 |

The exact values of material properties may differ from those shown in the table as they depend on film manufacturing and processing. The restraining layer 640 can also be made from a silicon oxynitride SiO$_x$N$_y$ where x is in the range of 0 to 2, and y is in the range of 0 to 1.5. The total thickness of the restraining layer 640 in the head has to be large enough to produce enough stress to compensate effectively for the expansion of layers with larger CTEs. The thickness of layer 640 is preferably 2 μm or more. Layer 640 with a CTE lower than the CTE of substrate 601 is shrinking relatively to the substrate 601 as temperature increases. This relative shrinking pulls back the expanding transducer components such as poles and shields.

As illustrated at the bottom of FIG. 6, the shape of the air bearing surface 622 at elevated temperatures would be as illustrated at line 619, 618 without the use of a restraint layer 640. However, with the use of restraint layer 640, the shape of the air bearing surface is as shown along line 619, 620, 621, 623. The substrate is effectively pulled back at 620 and the head 609 is effectively pulled back at 621 due to the relative shrinkage of the restraint layer at 623. The vertical scale of the illustrations at the bottom of FIG. 6 is exaggerated for clarity.

The head 600 is adaptable for use with a hard disc, a soft disc, magnetic tape or magneto-optic media.

Figure 7:
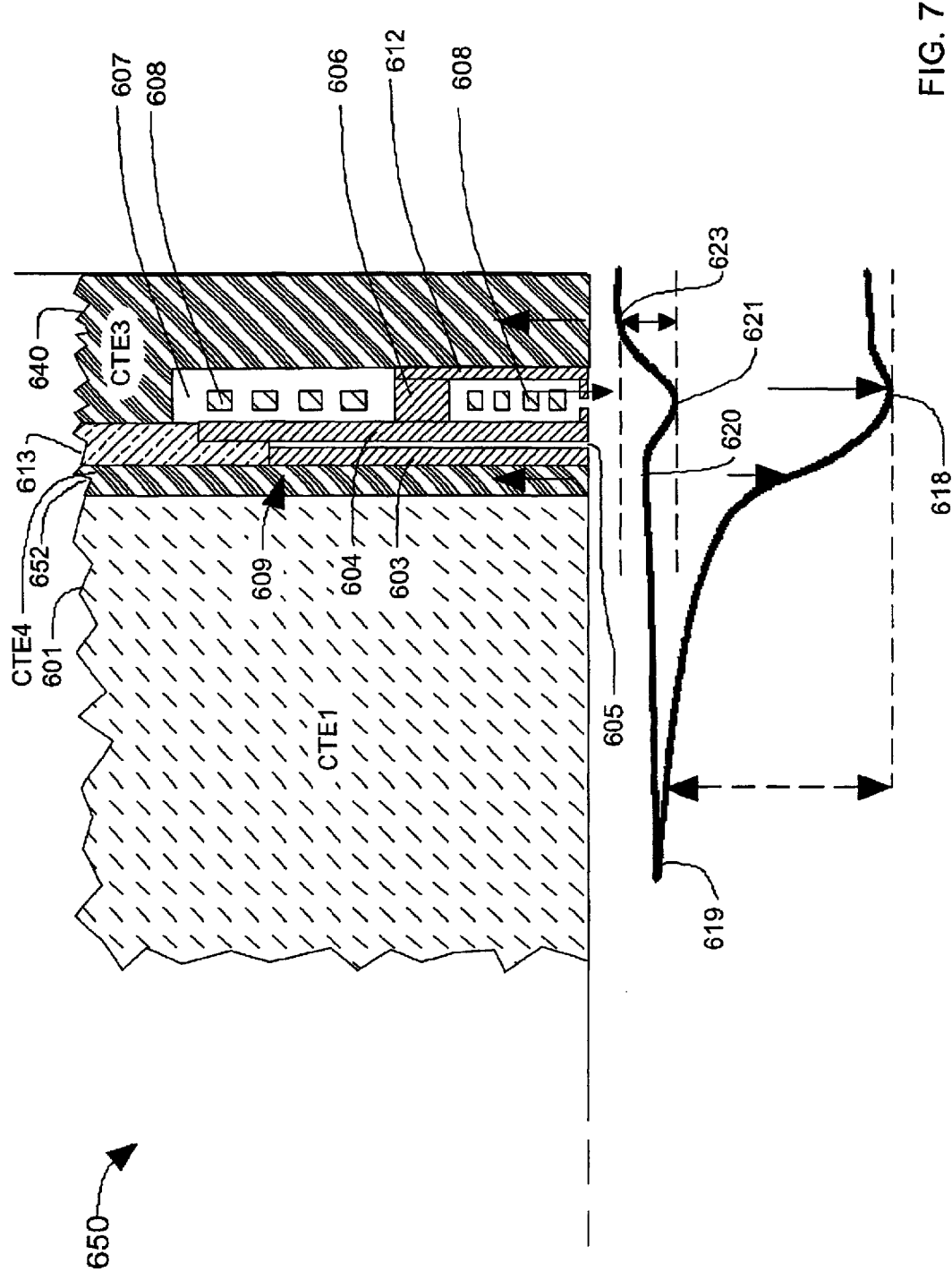
FIG. 7 schematically illustrates a cross-section of a head that includes two restraint layers.

FIG. 7 schematically illustrates a cross-section of a head 650 that includes two restraint layers 640, 652. The head 650 illustrated in FIG. 7 is substantially the same as the head 600 illustrated in FIG. 6, except that basecoat layer 602 of FIG. 6 has been replaced with a second restraint layer 652. The shape of the air bearing surface is further improved as shown at 620, 621, 623 in FIG. 7. Reference numerals used in FIG. 7 that are the same as reference numerals used in FIG. 6 designate the same or comparable features. In FIG. 6, the bond from the transducer 609 to the substrate 601 is made through basecoat layer 602. In FIG. 7, the bond from the transducer 609 to the substrate 601 is made through restraint layer 652. The transducer 609 and the restraint layers 652, 640 are bonded together to have a combined expansion rate that is substantially matched with CTE1, the expansion rate of the substrate 601. The restraint layer 640 serves as a protective overcoat for the components of the transducer.

Figure 8:
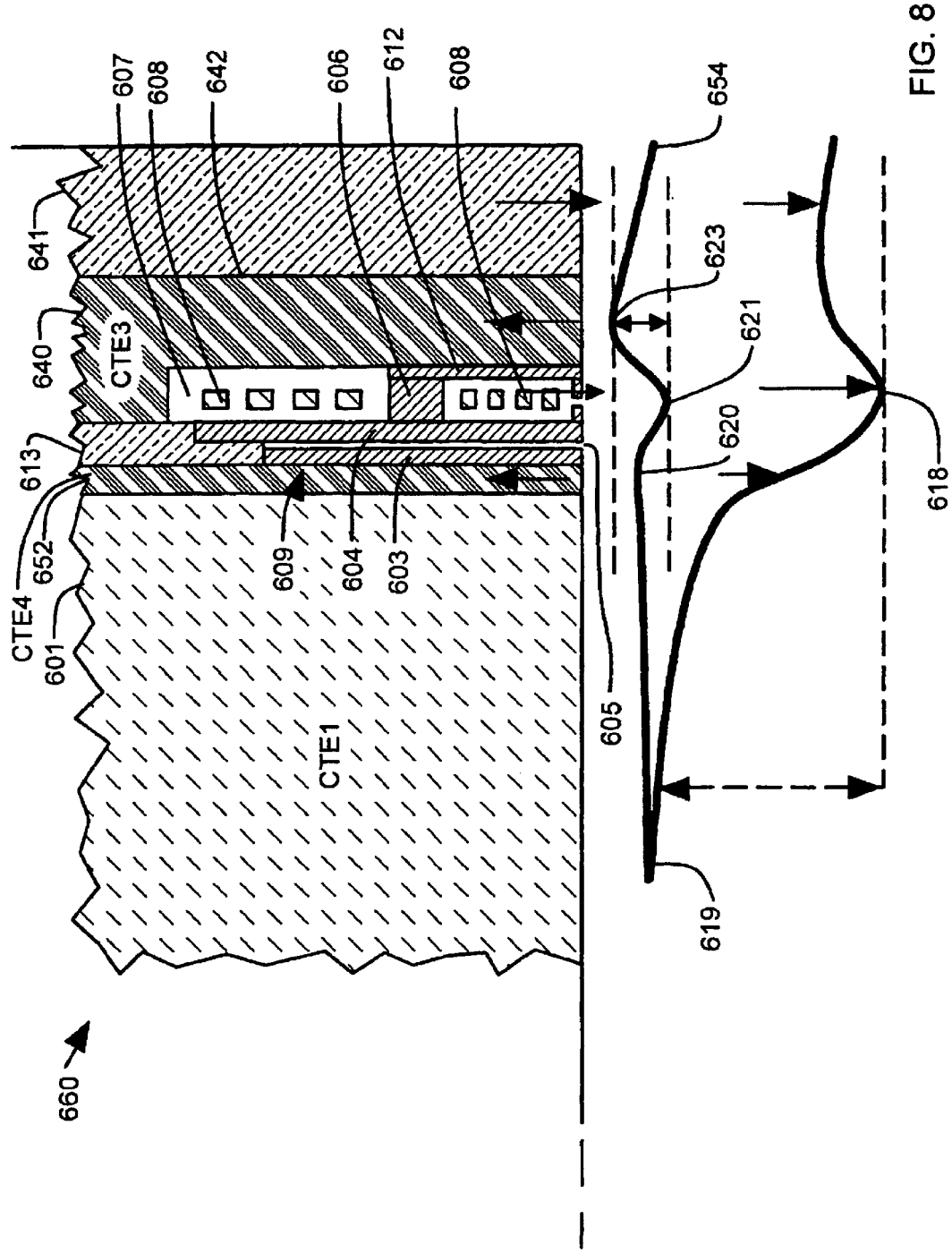
FIG. 8 schematically illustrates a cross-section of a head that includes two restraint layers and an additional overcoat layer.

FIG. 8 schematically illustrates a cross-section of a head 660 that includes two restraint layers 640, 652 and also a second overcoat layer 641. The head 660 illustrated in FIG. 8 is substantially the same as the head 650 illustrated in FIG. 7, except that the additional overcoat layer 641 has been added in FIG. 8. The shape of the air bearing surface is further improved as shown at 620, 621, 623, 654 in FIG. 8. Reference numerals used in FIG. 8 that are the same as reference numerals used in FIG. 7 designate the same or comparable features.

An additional benefit of the use of restraint layers is that restraint layers, particularly aluminum nitride, can have a higher thermal conductivity than aluminum oxide, which would otherwise be used. This improves heat dissipation from the head and allows higher levels of read or write currents to be used, or reduces operating temperature that, in turn, reduces pole/shield protrusion.

Figure 9:
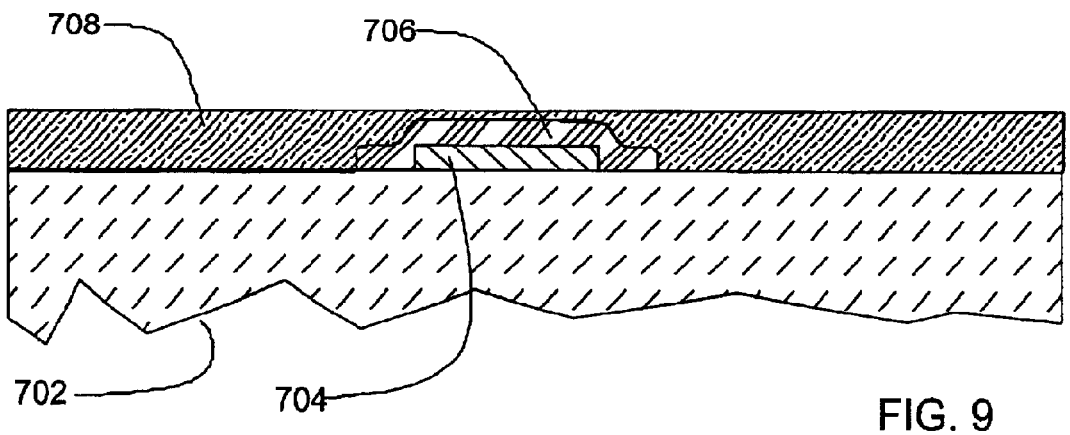
FIG. 9 schematically illustrates a cross-section of a head that includes a restraint layer that has a width that is substantially the width of the transducer.

FIG. 9 schematically illustrates a cross-section of a head that includes a restraint layer 706 that has a width that is substantially the width of the transducer 704 on a slider substrate 702. An additional overcoat 708 is applied over the restraint layer 706.

Figure 10:
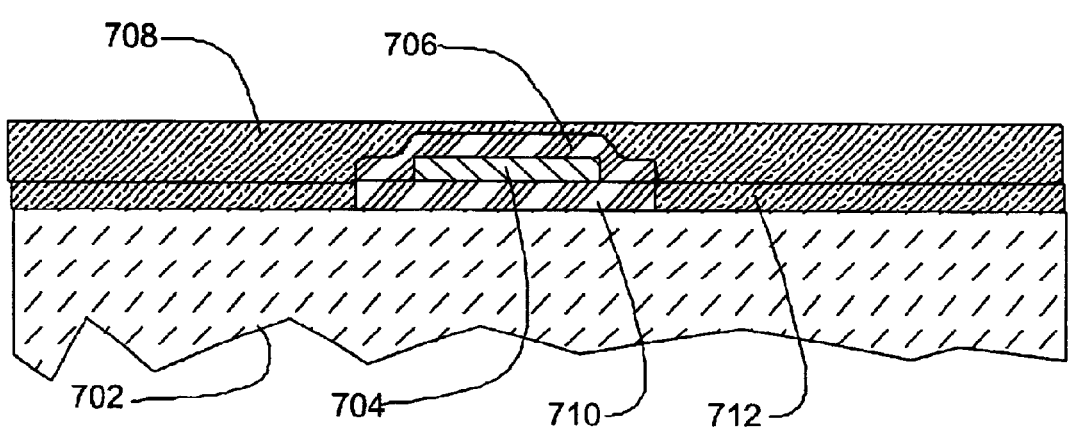
FIG. 10 schematically illustrates a cross-section of a head that includes two restraint layers that have widths that are substantially the width of the transducer.

FIG. 10 schematically illustrates a cross-section of a head that includes two restraint layers 706, 710 that have widths that are substantially the width of the transducer 704 on substrate 702. An additional overcoat layer 708 is applied over the restraint layer 706 and basecoat layer 712.

Figure 11:
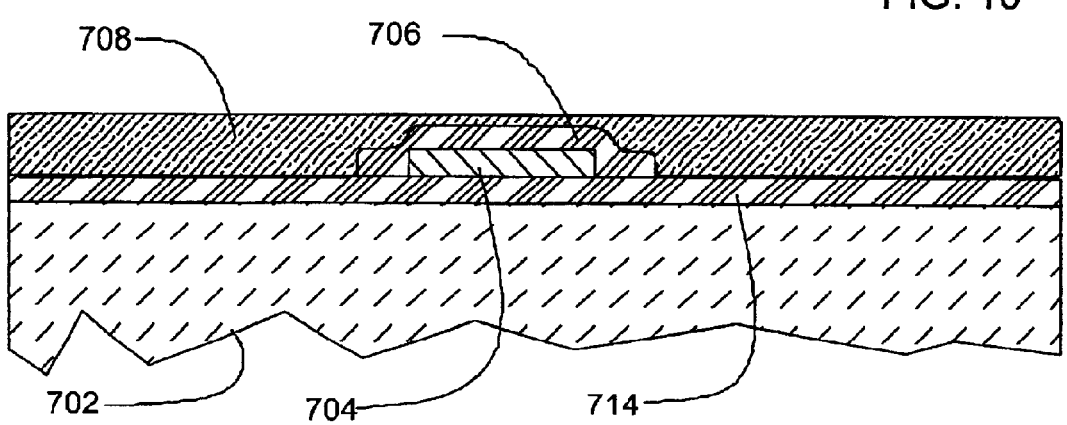
FIG. 11 schematically illustrates a cross-section of a head that includes a first restraint layer that has a width that is substantially the width of the transducer, and a second restraint layer that has a width that is substantially the width of the slider substrate.

FIG. 11 schematically illustrates a cross-section of a head that includes a first restraint layer 706 that has a width that is substantially the width of the transducer 704, and a second restraint layer 714 that has a width that is substantially the width of the substrate 702. An additional overcoat layer 708 is applied over the restraint layers 706, 714.

The cross sections illustrated in FIGS. 9–11 are generally parallel with an air bearing surface of the head.

In summary, a head (110, 600, 650, 660) for a magnetic drive (100), comprises a substrate (601) with a thermal expansion rate CTE1. A transducer (609, 704)) with two opposite sides is bonded to the substrate and has a transducer thermal expansion rate CTE2 that is greater than CTE1. A first restraint layer (640, 652, 706, 710 or 714) bonds to a first one of the sides of the transducer and has a first restraint layer thermal expansion rate CTE3 that is less than CTE1.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the head while maintaining substantially the same functionality without departing from the spirit and scope of the invention. The restraint layers can be formed of pure compounds or mixtures, provided that the restraint is accomplished. One, two or more of the insulating layers deposited around the patterned head can be formed as restraint layers. Restraint layers can cover the full width of the substrate or be patterned to cover only a portion of the substrate. In addition, although the preferred embodiments described herein are described in connection with a hard disc drive, it will be appreciated by those skilled in the art that the teachings of the present invention can be applied to other magnetic drives such as removable discs known as Zip and Jazz drives, tape drives and magneto optic drives without departing from the scope and spirit of the present invention.

What is claimed is:

1. A head for a magnetic drive, comprising:
   a substrate defining a generally planar air bearing surface and arranged with a face substantially in the plane of the air bearing surface and with a thermal expansion rate CTE1;
   a transducer that has a bond to the substrate on a first side and having a transducer thermal expansion rate CTE2 that is greater than CTE1 such that the transducer expands relative to the substrate with increasing temperature in a first direction perpendicular to the plane of the substrate, the transducer having a face in the plane of the air bearing surface; and
   a first restraint layer that has a bond to a second side of the transducer, opposite the first side, and that has a first restraint layer thermal expansion rate CTE3 that is less than CTE1,
   the first restraint layer having a thickness of at least 2 $\mu$m and a thermal expansion rate CTE3 of about $1\times10^{-6}/°$ C. to $4.3\times10^{-6}/°$ C., whereby the first restraint layer contracts relative to the substrate with increasing temperature in a second direction which is perpendicular to the plane of the substrate and opposite the first direction to reduce a distance of a thermal protrusion of the transducer beyond the plane of the substrate and maintain the arrangement of the face of the transducer substantially in the plane of the air bearing surface of the substrate.

2. The head of claim 1 wherein the transducer and the first restraint layer are bonded together to have a combined expansion rate that is substantially matched with CTE1.

3. The head of claim 1, wherein the first restraint layer has dimensions and material properties that are selected to limit protrusion of the transducer beyond the substrate over an operating temperature range.

4. The head of claim 1, further comprising:
   a second restraint layer positioned between the transducer and the substrate and that has a second restraint layer thermal expansion rate CTE4 that is less than CTE1.

5. The head of claim 4 wherein the transducer and the first and second restraint layers are bonded together to have a combined expansion rate that is substantially matched with CTE1.

6. The head of claim 5, further comprising a third layer that has a bond to the second restraint layer.

7. The head of claim 6, further comprising a bonding film between the second restraint layer and the third layer.

8. The head of claim 1 wherein the first restraint layer has a restraint layer width that is substantially the width of the transducer.

9. The head of claim 1 wherein the first restraint layer has a restraint layer width that is substantially the width of the substrate.

10. The head of claim 1 wherein the substrate comprises ceramic material with a thermal expansion rate in the range of about $7\times10^{-6}/°$ C. to $8.3\times10^{-6}/°$ C.

11. The head of claim 10 wherein the transducer comprises metals with thermal expansion rates in the range of $12\times10^{-6}/°$ C. to $17\times10^{-6}/°$ C.

12. The head of claim 11 wherein the first restraint layer comprises material selected from the group of materials consisting of: aluminum nitride, silicon nitride and silicon dioxide.

13. A method of manufacturing a head for a magnetic drive, comprising:
   A. providing a substrate defining a generally planar air bearing surface and arranged with a face substantially in the plane of the air bearing surface and with a thermal expansion rate CTE1;
   B. bonding a transducer with a thermal expansion rate CTE2 greater than CTE1 to the substrate on the first side, such that the transducer expands relative to the substrate with increasing temperature in a first direction perpendicular to the plane of the substrate, the transducer having a face in the plane of the air bearing surface;
   C. bonding a first restraint layer to a second side of the transducer, the first restraint layer having a thermal expansion rate CTE3 less than CTE1, the first restraint layer having a thickness of at least 2 $\mu$m and a thermal expansion rate CTE3 of about $1\times10^{-6}/°$ C. to $4.3\times10^{-6}/°$ C., whereby the first restraint layer contracts relative to the substrate with increasing temperature in a second direction which is perpendicular to the plane of the substrate and opposite the first direction to reduce a distance of a thermal protrusion of the transducer beyond the plane of the substrate and maintain the arrangement of the face of the transducer substantially in the plane of the air bearing surface of the substrate; and
   D. reducing pole tip protrusion of the transducer by restraining thermal expansion of the transducer in response to increasing temperature by pulling back on the transducer in the second direction with the restraint layer due to CTE3 being less than CTE1 and the opposed directions of expansion.

14. The method of claim 13 further comprising:
   D. bonding the transducer and the first restraint layer together to have a combined expansion rate that is substantially matched with CTE1.

15. The method of claim 13 further comprising:
   D. selecting dimensions and material properties for the first restraint layer to limit protrusion of the transducer beyond the substrate over an operating temperature range.

16. The method of claim 13, further comprising:

D. bonding a second restraint layer to a second one of the sides of the transducer, the second restraint layer having a thermal expansion rate CTE4 that is less than CTE1.

17. The method of claim 13 further comprising:

D. including a material in the first restraint layer selected from the group: aluminum nitride, $Si_3N_4$ and $SiO_2$.

18. The method of claim 13, further comprising:

D. forming the first restraint layer by thin film deposition.

19. A head for a magnetic drive, comprising:

a substrate defining a generally planar air bearing surface and arranged with a face substantially in the plane of the air bearing surface and with a thermal expansion rate CTE1;

a transducer with a thermal expansion rate CTE2 greater than CTE1 to the substrate on the first side, such that the transducer expands relative to the substrate with increasing temperature in a first direction perpendicular to the plane of the substrate, the transducer having a face in the plane of the air bearing surface;

a restraining means bonded to a second side of the transducer, the restraining means having a thermal expansion rate CTE3 less than CTE1, the first restraint layer having a thickness of at least 2 μm and a thermal expansion rate CTE3 of about $1 \times 10^{-6}/°$ C. to $4.3 \times 10^{-6}/°$ C., whereby the first restraint layer contracts relative to the substrate with increasing temperature in a second direction which is perpendicular to the plane of the substrate and opposite the first direction for reducing a distance of a thermal protrusion of the transducer beyond the plane of the substrate and maintain the arrangement of the face of the transducer substantially in the plane of the air bearing surface of the substrate and for reducing pole tip protrusion of the transducer by restraining thermal expansion of the transducer in response to increasing temperature by pulling back on the transducer in the second direction with the restraint layer due to CTE3 being less than CTE1 and the opposed directions of expansion.

\* \* \* \* \*